US005768508A

United States Patent [19]

Eikeland

[11] Patent Number: 5,768,508
[45] Date of Patent: Jun. 16, 1998

[54] COMPUTER NETWORK SYSTEM AND METHOD FOR EFFICIENT INFORMATION TRANSFER

[75] Inventor: Martin Eikeland, Bekkestua, Norway

[73] Assignee: Digilog AB, Oslo, Norway

[21] Appl. No.: 832,687

[22] Filed: Apr. 11, 1997

Related U.S. Application Data

[63] Continuation-in-part of Ser. No. 632,102, Apr. 15, 1996.

[51] Int. Cl.$^6$ ............................................. G06F 15/16
[52] U.S. Cl. ........................ 395/200.32; 395/200.63; 395/200.47; 395/200.54
[58] Field of Search ................... 395/200.47, 200.48, 395/200.49, 200.53, 200.54, 200.55, 200.61, 200.62, 200.63, 200.64, 200.65, 200.32; 370/230, 232, 233, 234, 235; 707/10

[56] References Cited

U.S. PATENT DOCUMENTS

| | | | |
|---|---|---|---|
| 4,991,172 | 2/1991 | Cidon et al. | 370/400 |
| 5,193,151 | 3/1993 | Jain | 395/200.67 |
| 5,263,157 | 11/1993 | Janis | 395/200.59 |
| 5,329,619 | 7/1994 | Pagé et al. | 395/200.33 |
| 5,347,632 | 9/1994 | Filepp et al. | 395/200.32 |
| 5,404,505 | 4/1995 | Levinson | 395/610 |
| 5,500,890 | 3/1996 | Rogge et al. | 379/91.02 |
| 5,504,744 | 4/1996 | Adams et al. | 370/232 |
| 5,519,689 | 5/1996 | Kim | 370/232 |
| 5,528,501 | 6/1996 | Hanson | 364/443 |
| 5,572,643 | 11/1996 | Judson | 395/200.48 |
| 5,610,910 | 3/1997 | Focsaneanu et al. | 370/351 |
| 5,617,565 | 4/1997 | Augenbraum et al. | 395/604 |
| 5,694,594 | 12/1997 | Chang | 395/606 |
| 5,710,884 | 1/1998 | Dedrick | 395/200.47 |

FOREIGN PATENT DOCUMENTS

| | | |
|---|---|---|
| 0 384 339 A2 | 8/1990 | European Pat. Off. . |
| 0 570 683 A2 | 11/1993 | European Pat. Off. . |
| 0 582 537 A2 | 2/1994 | European Pat. Off. . |
| 0 632 672 A2 | 1/1995 | European Pat. Off. . |
| WO 97/39548 | 10/1997 | WIPO . |

OTHER PUBLICATIONS

PCT Search Report for International Application No. PCT/NO97/00096, Oct. 24, 1997.

Wakeman, I. et al., "Implementing Real Time Packet Forwarding Policies Using Streams."Processing of the 1995 USENIX Technical Conference, Jan. 16–20, 1995 New Orleans, LA, USA, pp. 71–82.

Khayata, R. et al., "A Distributed Medium Access Protocol For Wireless LANs," Record of the Asilomar Conference on Signals, vol. 1, No. Conf. 28, 1995 IEEE, pp. 238–242.

Kohda, Y. and Endo, S. "Ubiquitous Advertising on the WWW: Merging Advertisement on the Browser," Computer Networks and ISDN Systems, vol. 28 (1996), pp. 1493–1499.

*Primary Examiner*—Tod R. Swann
*Assistant Examiner*—Conley B. King, Jr.
*Attorney, Agent, or Firm*—Finnegan, Henderson, Farabow, Garrett and Dunner, L.L.P.

[57] ABSTRACT

A computer network connects information providers and end-users of network services, facilitates direct information to users, and gathers user responses. The computer network is designed to use otherwise idle bandwidth of the network transmission medium to transfer targeted commercial and non-commercial information to users while minimizing the delay of normal network traffic. User reports containing demographics and user responses are generated ensuring user privacy. Information providers can access user reports without violating user anonymity.

30 Claims, 10 Drawing Sheets

COMPUTER NETWORK SYSTEM AND METHOD FOR EFFICIENT INFORMATION TRANSFER

RELATED APPLICATIONS

This application is a continuation-in-part of U.S. patent application Ser. No. 08/632,102 filed on Apr. 15, 1996, the contents of which are hereby incorporated by reference.

BACKGROUND OF THE INVENTION

The present invention relates generally to computer networks that connect information providers and end-users of network services. More particularly, the present invention relates to a system for providing targeted information to users efficiently.

A user often connects to a network service to view or download information from a wide array of resources. Network services include various networks, e.g., Internet, or other online services, e.g. AMERICA ONLINE, COMPUSERVE, DIALOG, GENIE, and PRODIGY. When a user selects desired information from such a service, the service transmits the selected information to the user over a network transmission medium in packets. The transmission capacity of a network is measured in bandwidth and information packets are transmitted over available bandwidth using TCP/IP (Transmission Control Protocol/Internet Protocol). Currently, network service users have exclusive control over selecting information for viewing or downloading.

This type of system, however, has many disadvantages. First, the network service user greatly underutilizes the available bandwidth. For example, no use is made of free space between information packets transmitted over an active transmission medium. Additionally, the entire bandwidth of an idle link is wasted when the user does not request information transfer.

In addition to the significant underutilization of the bandwidth, one-sided control of information transfer by the user is undesirable from the perspective of both users and information providers, such as commercial or non-commercial entities that furnish information to users through network services. The Internet offers a vast amount of information and continues to expand with tremendous speed, making it extremely difficult for any one user to maintain a comprehensive knowledge of all available information and resources and keep current with the changes and additions to the Internet resources. Most often, a user accesses only a small portion of the available information and a user's breadth of access depends significantly on the user's current knowledge of the available resources. Therefore, the user receives only a part of the benefit the Internet can provide.

One-sided user control further restricts information providers from offering better services. Currently, information providers cannot furnish information directly to a specific group of users. Only users who know of and make effort to access specific information receive that information. Moreover, information providers only transmit information to specific users by e-mail (electronic mail). Mass e-mail, however, is not specifically targeted to a particular audience, and many users find mass e-mail irrelevant or uninteresting and quickly discard it as "junk mail."

Additionally, information providers often cannot gather information about the users' access to its products, such as what content they view, when they view it, how often they view it, and how long they view it. Information providers also may not know its number of users or their demographics. For example, although it is possible to record how many times an Internet site has been accessed, that record does not demonstrate whether the user actually views the information. Good statistical information data can help information providers assess user interests, and thereby improve and better tailor the information to user interest.

Therefore, it is desirable to maximize the use of network bandwidth by delivering information targeted specifically to a user's interests and hobbies during times when the network is not otherwise engaged. For example, it is desirable to transmit information to users during idle times. It is also desirable to transmit targeted information to the user by utilizing otherwise idle bandwidth and thus cause little or no additional delay to normal network traffic.

In addition, it is desirable to gather information about the users without invading user privacy.

It is further desirable to generate a report of user responses for information providers with accurate assessment of user demand to create a more attractive and dynamic network service environment.

SUMMARY OF THE INVENTION

Accordingly, the present invention is directed to a computer network that substantially obviates one or more of the problems due to limitations and disadvantages of the related art.

In accordance with the purpose of the present invention, as embodied and broadly described, the invention provides a computer network for connecting information providers and users for transferring target information to the users comprising a user node, a master database, a master node, and a master program. The user node includes means for sending a node ID corresponding to the user node, means for controlling the transfer of the target information in the background while transferring non-target information to the user node without additional communication delay, and means for receiving the target information. The master database contains profile information and corresponding target information reference. The master node, coupled to the user node, includes means for transferring the target information reference to the user node. The master program, coupled to the master node and the master database, includes means for receiving the node ID from the user node, means for accessing from the master database profile information corresponding to the node ID, and means for transmitting the target information reference corresponding to the accessed profile information to the user node.

According to another aspect of the present invention, a method for connecting information providers and users comprises several steps. A user node sends to a master program a node ID corresponding to the user node. The master program accesses profile information corresponding to the node ID, and transmits a target information reference corresponding to the accessed profile information to the user node. The user node controls the transfer of the target information in the background while transferring non-target information to the user node without additional communication delay, and receives the target information.

BRIEF DESCRIPTION OF THE DRAWINGS

The accompanying drawings, which are incorporated in and constitute a part of this specification, illustrate the invention and together with the description, serve to explain the principles of the invention.

In the drawings.

DESCRIPTION OF THE PREFERRED EMBODIMENT

Figure 1:
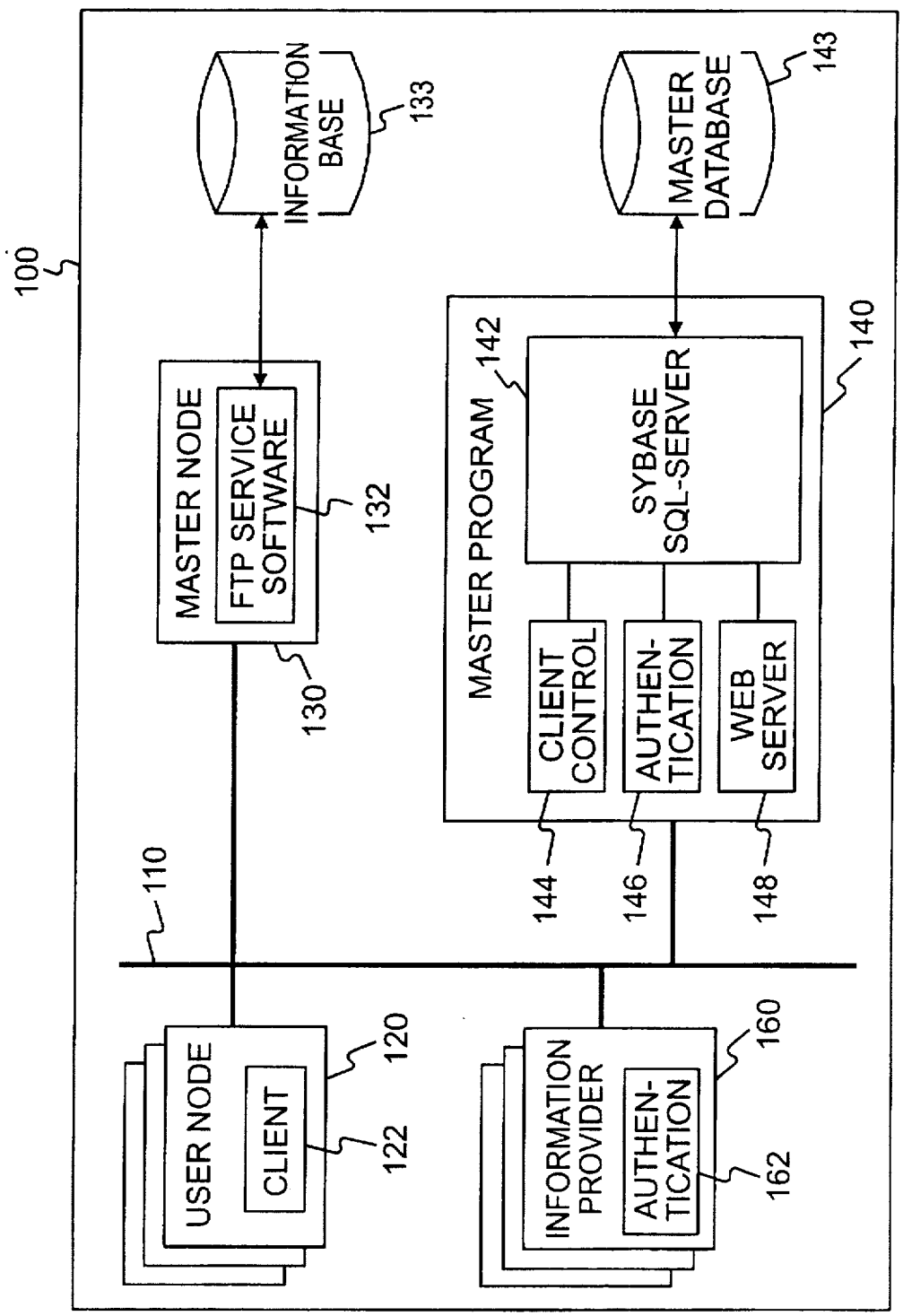
FIG. 1 is a block diagram of a preferred embodiment of the computer network according to the present invention.

FIG. 1 shows a computer network 100 according to the present invention. Various hardware and software components of computer network 100 are connected by transmission medium 110. A user node 120 is typically a personal computer, and Client 122 is a program resident on user node 120 to control network information transfer.

A master node 130 is preferably a server which has a special FTP (File Transfer Protocol) service 132 that transfers information to the user in conjunction with Client 122. Preferably, service 132 includes FTP software that provides the necessary mechanism to minimize interference with network traffic. Special FTP service 132 also accesses information base 133 containing referenced information items.

Master program 140 is a large server preferably built on a Sybase SQL-Server platform 142, but one of ordinary skill can easily substitute the Sybase SQL-Server with other similar database technology. Sybase SQL-Server platform 142 accesses a master database 143, which contains user information including user profile information and target information references. A client control program 144 interacts with Client 122 on user node 120. An authentication program 146 monitors network access, and a web server 148 provides a home page for user node registration, information, and maintenance.

Information providers 160, containing an authentication program 162 to monitor network access, may include a wide array of commercial and non-commercial entities desiring to furnish information on the network.

Figure 2:
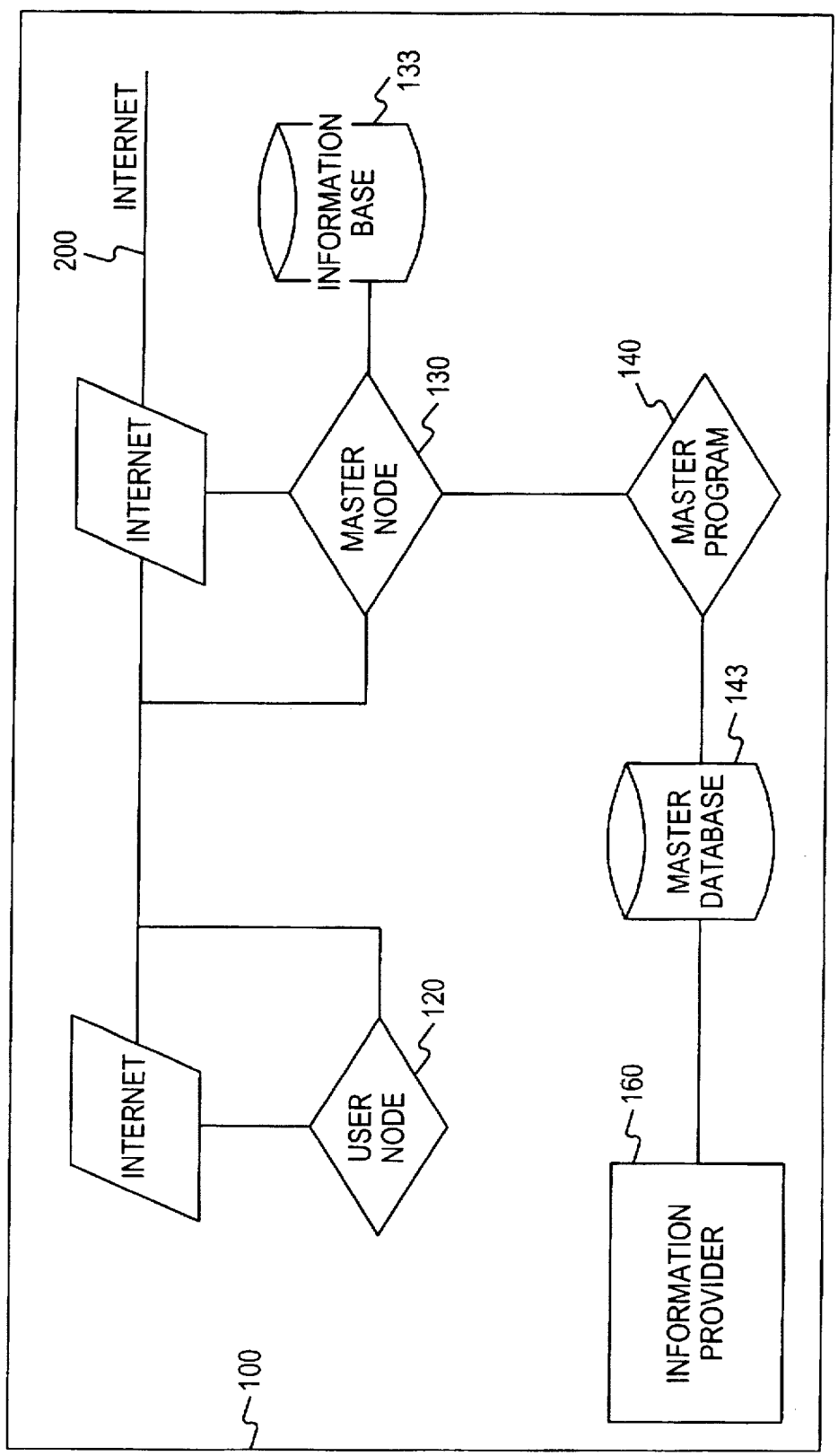
FIG. 2 is a functional representation of the computer network shown in FIG. 1.

FIG. 2 is a functional representation of the computer network 100 shown in FIG. 1. For convenience, Internet will be used as an exemplary network service.

Figure 3:
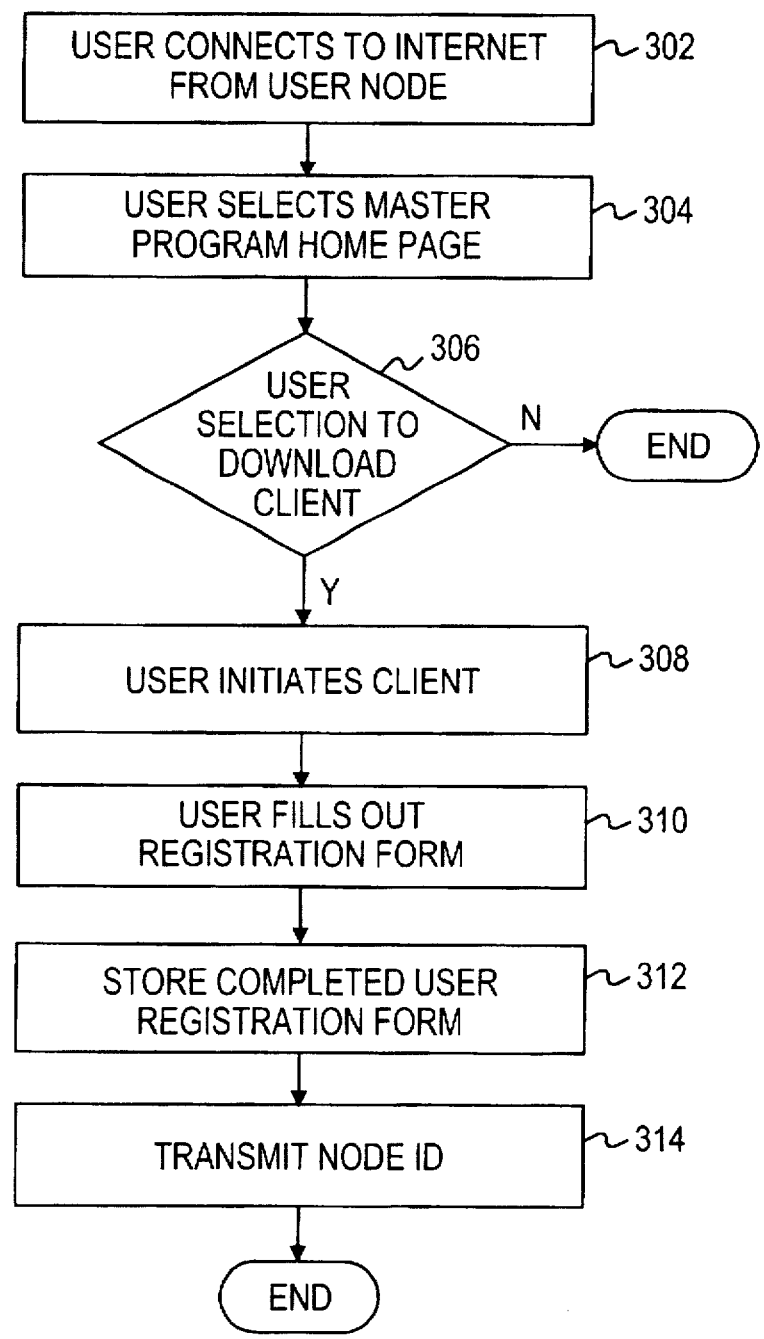
FIG. 3 is a flowchart of a user registration process according to a preferred implementation of this invention.

The first step in using network 100 is the user node registration process, which will be explained with reference to FIG. 3. To start a network session, a user at user node 120 connects to the Internet 200 of FIG. 2 (step 302). While "surfing" on the Internet 200, the user may select the home page of master program 140 (step 304).

If user node 120 is not registered, the user may select to download Client 122 (step 306). The user can then initiate Client 122 (step 308) and complete the registration form on screen by providing user profile information, such as age, gender, educational level, work status, items of interests, and hobbies (step 310). User profile information may be updated at any time during or after the registration process. Additionally, updates of Client 122 may also be downloaded at any time while preserving the registered user profile information.

User node 120 transmits the completed form to master program 140, which stores it in master database 143 (step 312). Once master program 140 receives the completed form from user node 120, program 140 transmits a unique node ID to user node 120 (step 314). This completes the user node registration process. On subsequent user connections, master program 140 uses the registered user profile information corresponding to the node ID of user node 120 regardless of the identity of the particular user at user node 120. Additionally, after Client 122 has been downloaded and is active on user node 120, authentication program 146 is not executed on subsequent user access to network 100.

Figure 4:
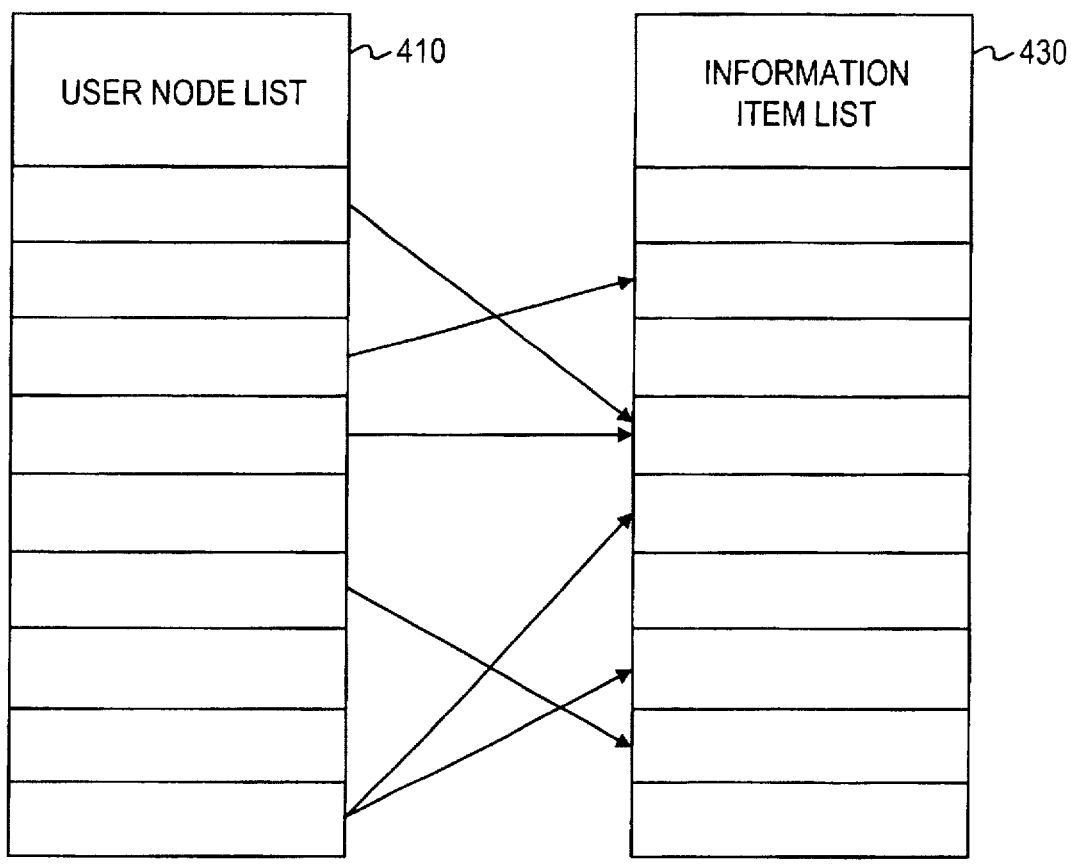
FIG. 4 is a diagram illustrating several lists in the master database shown in FIG. 1.

FIG. 4 shows two lists, i.e., user node list 410 and information item list 430. Node IDs corresponding to registered user node 120 are compiled in user node list 410. Use of node IDs ensures user privacy and anonymity because the node IDs do not reveal the identity or profile of a particular user at user node 120. Each segment of user node list 410, preferably containing a single node ID, points to a particular segment of information item list 430 that contains pointers or addresses to the relevant target information to be sent to user node 120.

Figure 5A:
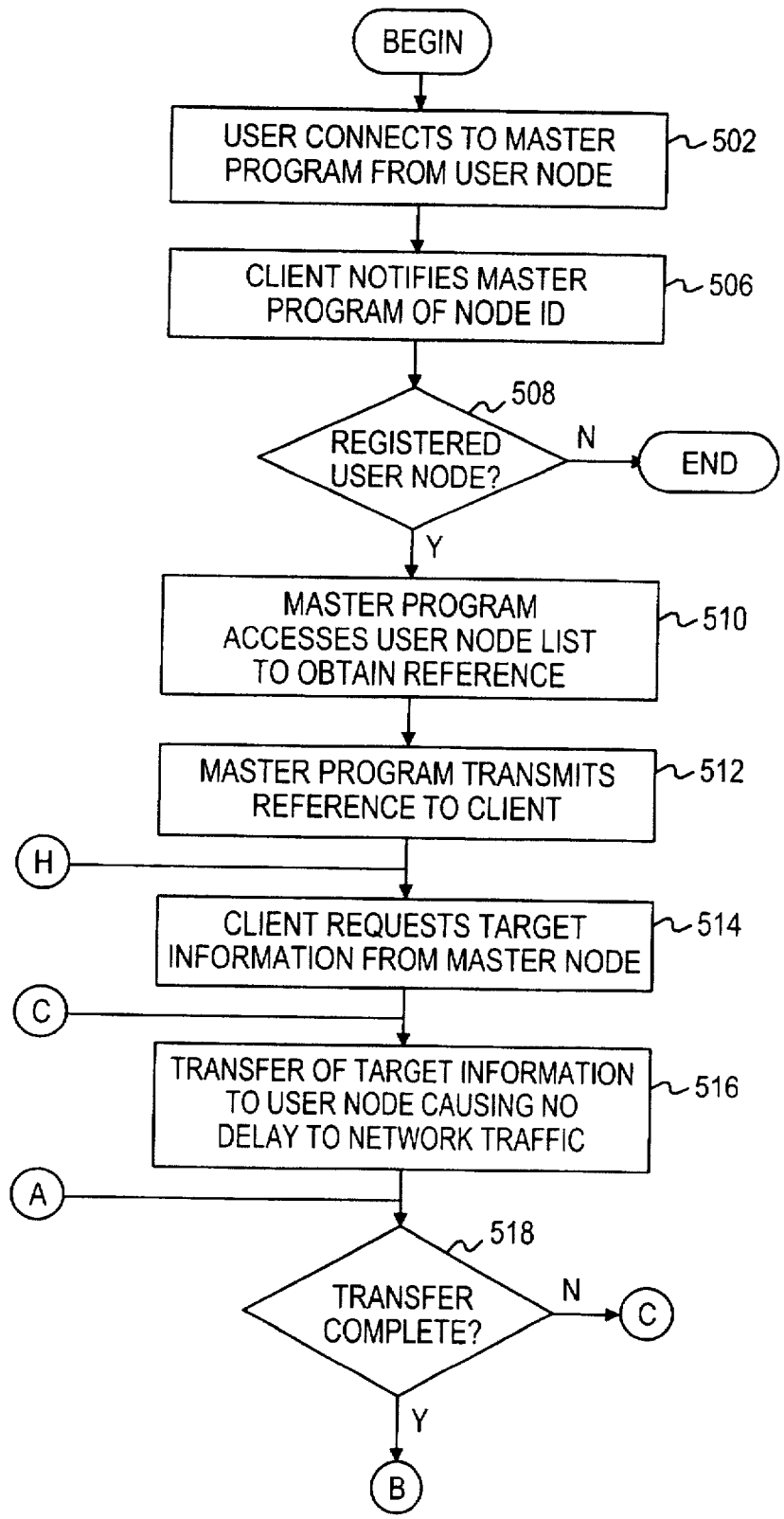
FIGS. 5A and 5B are flowcharts of the overall process of a computer network of FIG. 1.

FIG. 5A contains a flowchart showing the process of transmitting target information to user node 120 using otherwise idle bandwidth. When a user at user node 120 connects to web server 148 of master program 140 (step 502), Client 122 notifies master program 140 of the node ID (step 506). If master program 140 receives a node ID from a registered user node 120 (step 508), master program 140 accesses user node list 410 to identify the corresponding segment of information item list 430 (hereinafter referred as "reference") stored in master database 143 (step 510). Upon request from Client 122, master program 140 transmits the reference to Client 122 of user node 120 (step 512). This enables Client 122 to begin requesting target information stored in information base 133 corresponding to the reference (step 514).

During the user's session on computer network 100, either master node 130 or Client 122 automatically transfers the referenced target information in the background to user node 120, causing little or no delay to network traffic (step 516). The target information is transmitted in packets over a transmission medium until all packets are transferred (step 518).

To transfer target information causing little or no additional communication delay of non-target information between master node 130 and user node 120, Client 122 causes master node 130 to send target information packets on an active link when non-target information packets are not being sent. If a link is completely idle, for example, when the user is not requesting any information, Client 122 causes master node 130 to send target information packets over the idle link.

Figure 6:
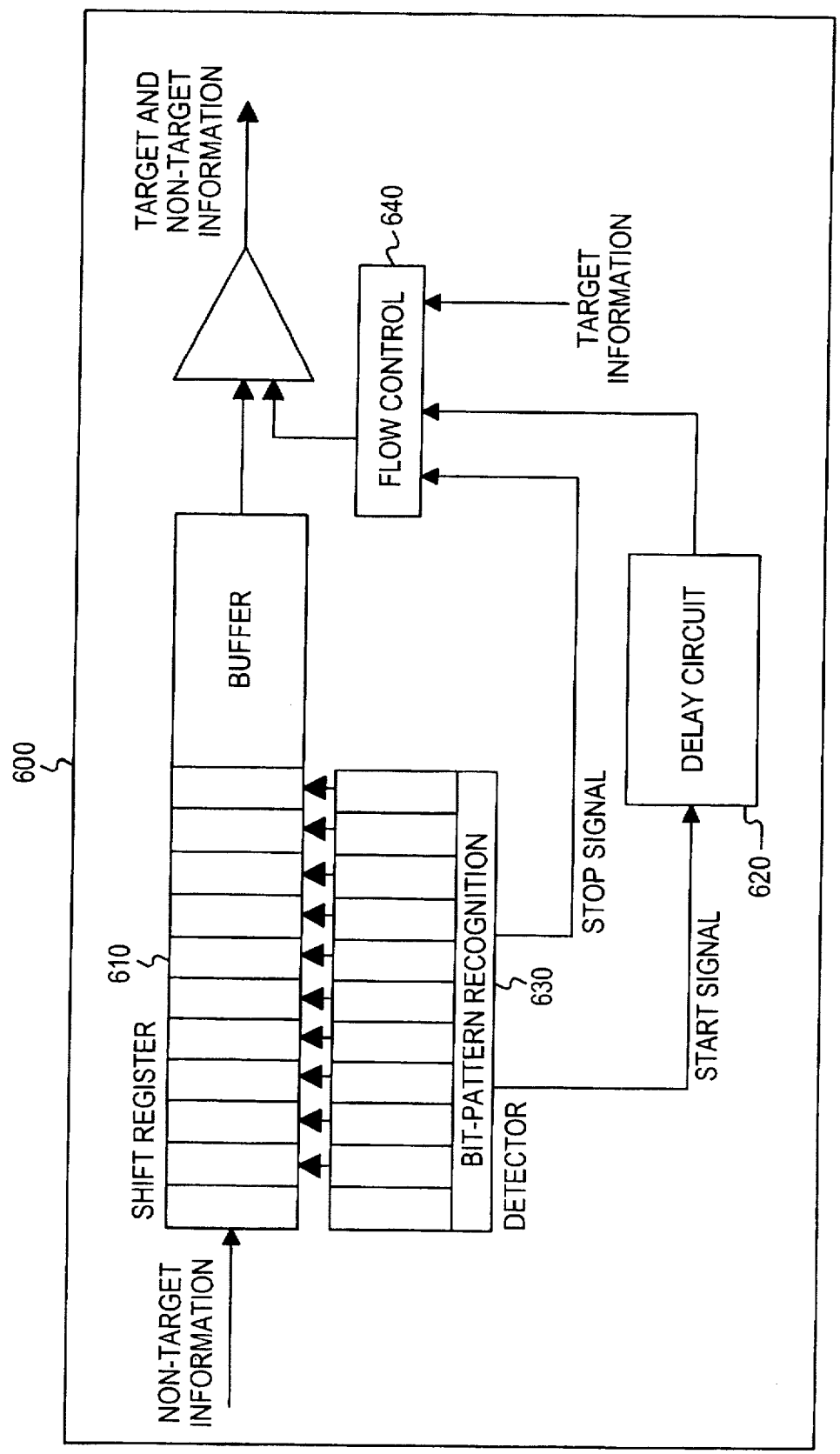
FIG. 6 is a schematic diagram of a network traffic monitor according to one embodiment of the present invention.
Figure 7:
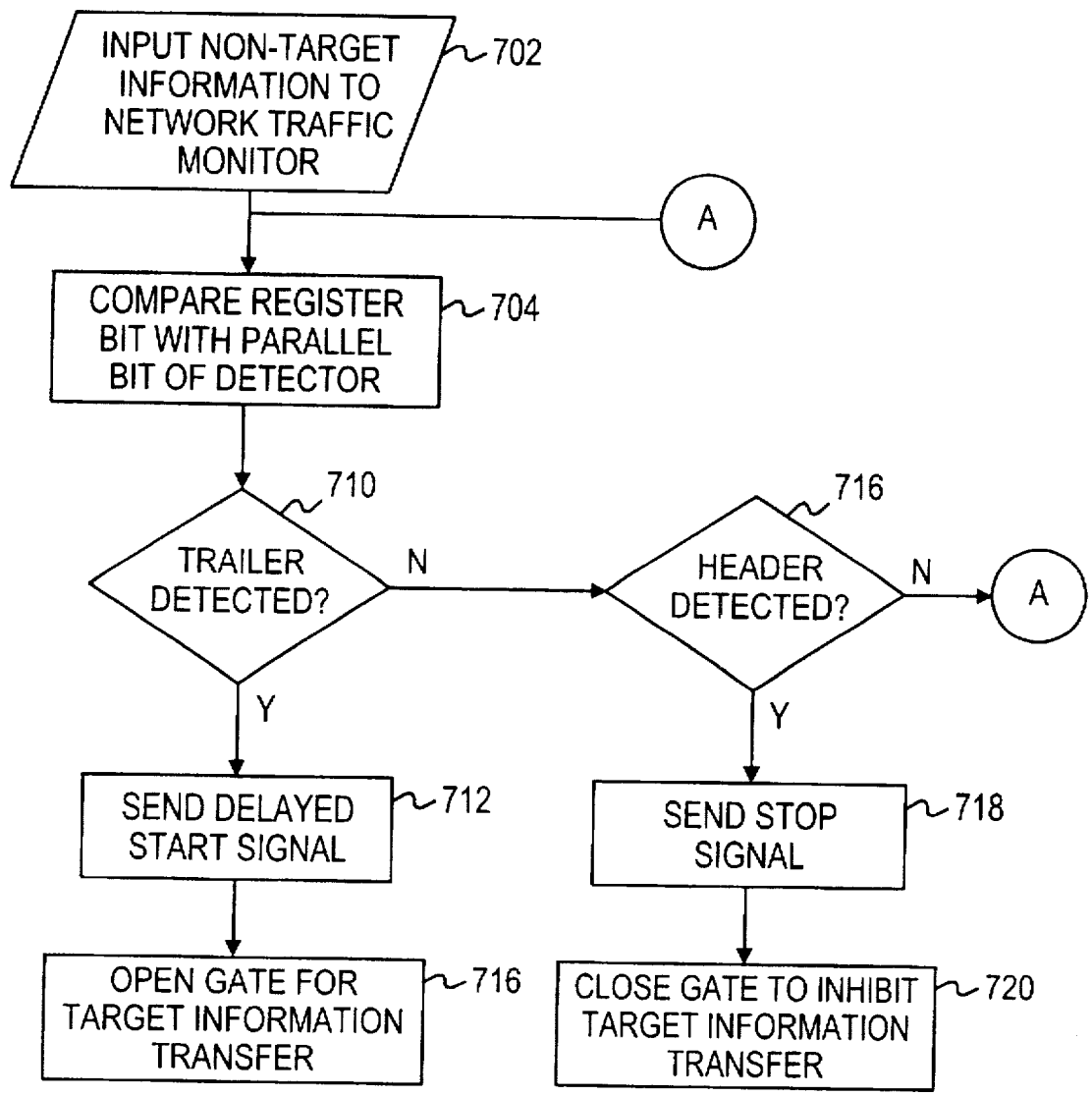
FIG. 7 is a flowchart illustrating the process of the network traffic monitor of FIG. 6.

FIGS. 6 and 7 show a schematic diagram and flowchart, respectively, of a circuit used to eliminate communication delay of non-target information according to one embodiment of special FTP service 132 of the present invention. Network traffic monitor 600 resident on master node 130 includes a shift register 610, a delay circuit 620, a detector 630, and a flow control 640. Network traffic monitor 600 monitors the network traffic on the transmission medium between user node 120 and master node 130.

First, non-target information packet is input to network traffic monitor 600 (step 702). Each bit of shift register 610 is then compared to a parallel bit of detector 630 to detect an identification bit-pattern, i.e., header or a trailer, of non-target information packets (step 704). If a trailer of an information packet is detected (step 710), a delayed start signal is sent by delay circuit 620 to flow control 640 (step 712) to open the gate for transfer of target information packets (step 716). The delayed start signal ensures that all non-target information has been transferred before initiating target information transfer.

On the other hand, if a header is detected (step 716), a stop signal is immediately sent to flow control 640 (step 718) to close the gate to inhibit the transfer of target information packets (step 720). Delay circuit 620 actually sends the stop signal before the detected non-target information packet to assure that incoming non-target information does not collide with incoming target information packets.

Figure 8:
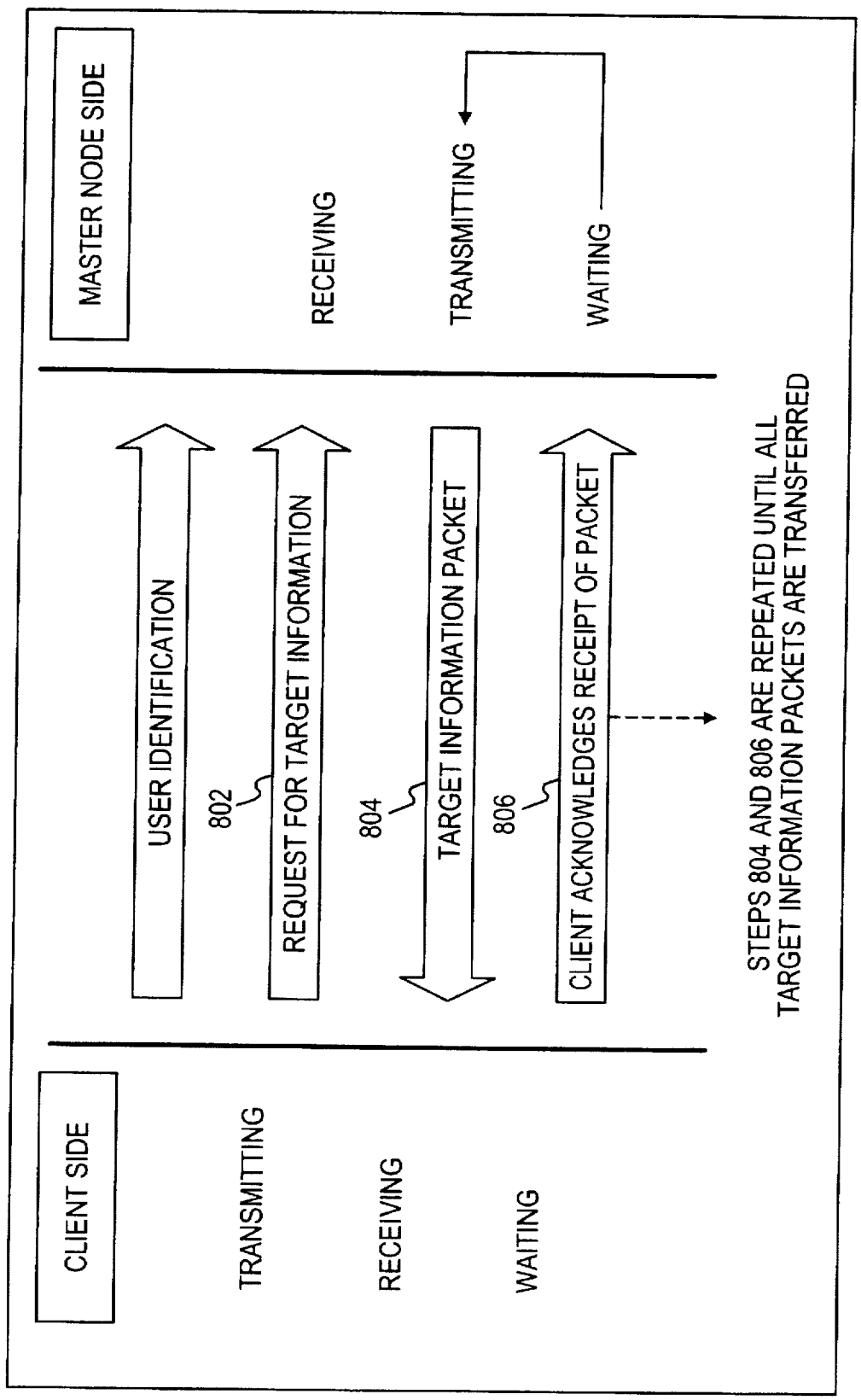
FIG. 8 is a schematic diagram of a special FTP service software according to another embodiment of the present invention.

FIG. 8 shows a schematic diagram of special FTP service software 132 for minimizing communication delay of non-target information according to another embodiment of special FTP service 132. In this embodiment, master node 130 regulates the transfer of target information packets depending on the amount of network traffic on the transmission medium.

As previously explained, Client 122 on user node 120 begins to request transfer of target information from master node 130 (step 802). Upon receiving the request for target information, master node 130 sends a packet of target information to Client 122 (step 804). Client 122 receives the target information packet and returns an acknowledgment of receipt to master node 130 for each packet received (step 806). Steps 804 and 806 repeat until a complete unit of target information is transferred to a temporary file at user node 120.

Master node 130 estimates the level of non-target information traffic by measuring the length of time between transmittal of a target information packet and receipt of acknowledgment from Client 122. If there is little network traffic, an acknowledgment is returned quickly. The higher the level of network traffic, the longer it takes to receive an acknowledgment. The master node 130 adjusts the amount of target information packets transmitted in accordance with the amount of time it takes to receive Client 122 acknowledgments. When the amount of time to receive acknowledgments reaches a predetermined maximum, however, master node 130 reduces the number of target information packets transferred. Therefore, transfer of target information packets has a minimal effect on non-target information traffic.

In ordinary TCP/IP, a maximum amount of data is transmitted and long trains of IP packets are queued on the receiving side. However, the present embodiment sends only a limited amount of target data to avoid interfering with the transfer of non-target information. Hence, the user does not notice any significant increase in transmission times for ordinary Internet traffic.

The process demonstrated in FIG. 8 may be modified to pace the transfer of target information packets dynamically by time-stamping the acknowledgments. This relieves master node 130 from waiting for actual acknowledgments of each packet.

Additionally, the process may also be modified to adjust the size of the send-window dynamically (number of bytes/ packets sent before receiving acknowledgment). Master node 130 may adjust the send-window size according to estimates made by tracing the amount of time it takes to receive acknowledgment. For example, user node 120 with a 28.8 kbps modem can tolerate a much higher transfer rate than one with a 12.4 kbps modem. Hence, the send-window can be adjusted accordingly.

Figure 9:
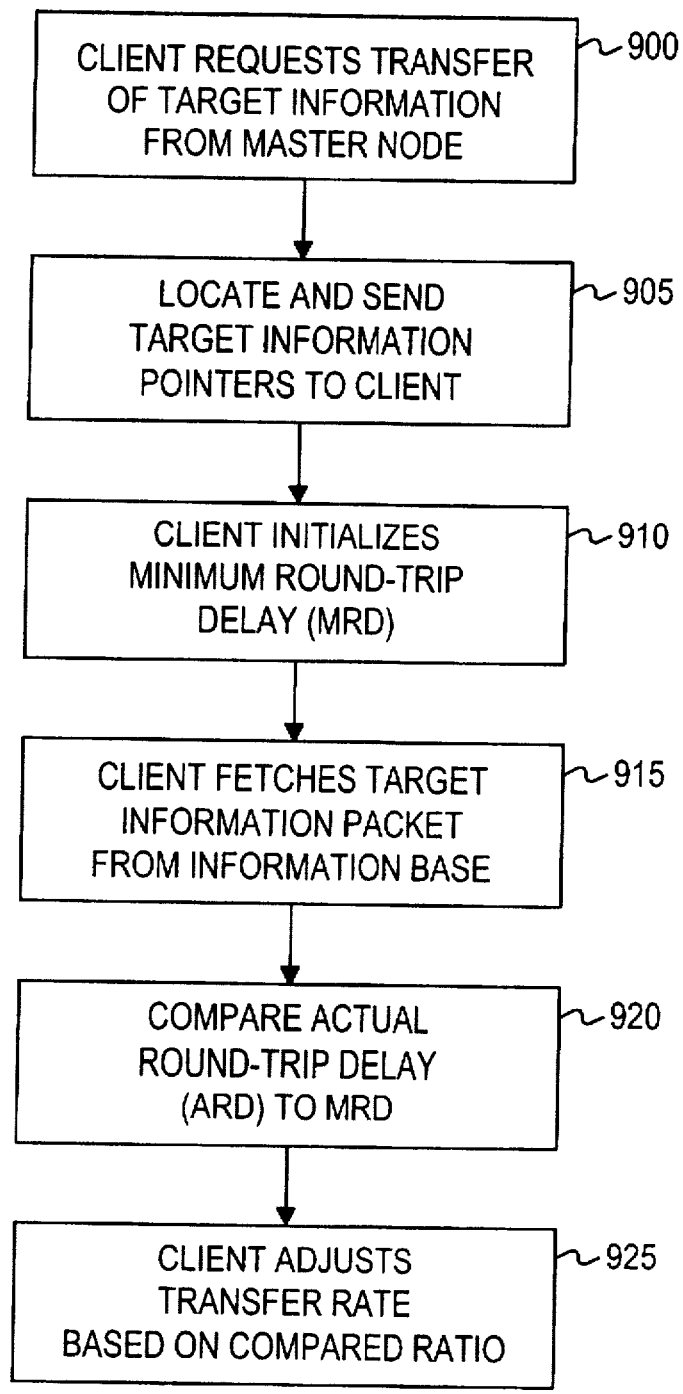
FIG. 9 is a flowchart illustrating the process of controlling network traffic according to yet another embodiment of the present invention.

FIG. 9 shows another process consistent with the present invention, where Client 122 controls the transfer of target information to user node 120. Similar to previous embodiments, Client 122 on user node 120 requests transfer of target information from master node 130 (step 900). In response, master node 130 locates the reference corresponding to the segment of user node list 410 corresponding to the node ID. Once master node 130 locates the reference containing target information pointers, node 130 sends the reference to Client 122 (step 905).

Client 122 receives the reference from master node 130, and regulates the transfer of target information according to the target information pointers. Initially, Client 122 sets a predetermined value of a minimum round-trip delay (MRD), the minimal amount of time necessary between the request and receipt of network information (step 910). One may set the MRD of a target information packet, for example, to 200 milliseconds. In the preferred embodiment, MRD should be set slightly lower than the actual estimated MRD. This increases the possibility that target information transfer will not interfere with non-target information traffic.

Once the initial MRD is set, Client 122 begins to fetch the target information from information base 133 corresponding to the target information pointers (step 915). Client 122 preferably fetches the target information one packet at a time. Throughout the process, Client 122 preferably measures the actual round-trip delay (ARD) of each packet of target information and compares that to the MRD (step 920). Client 122 adjusts the transfer rate of the target information based on the ratio of ARD to MRD (ARD/MRD) (step 925).

If the ARD/MRD ratio is 1–1, for example, Client 122 may wait a preset time period, i.e., 2 seconds, before fetching the next packet of target information. As the ARD/ MRD ratio increases, however, the wait time before fetching another target information packet should increase accordingly. If, for example, ARD is 300 milliseconds while MRD is 200 milliseconds, then Client may wait 3 seconds before the next fetch.

A low ARD/MRD implies little or no non-target information network traffic, thus allowing transfer of target information packets using otherwise underutilized bandwidth. A high ARD/MRD ratio, on the other hand, implies a high level of non-target information network traffic, so Client 122 decreases the transmission rate of the target information packets accordingly.

One of ordinary skill may vary the relationship between the ratio and the corresponding wait time, for example, linearly or exponentially. By adjusting the wait time dynamically based on the ARD/MRD ratio, Client 122 ensures that the transfer of target information will cause no additional delay to non-target network traffic. The ratios and wait times described here are exemplary only, and one skilled in the art may easily modify various settings including the frequency of ARD/MRD ratio comparison the initial MRD, and the corresponding wait time.

Figure 5B:
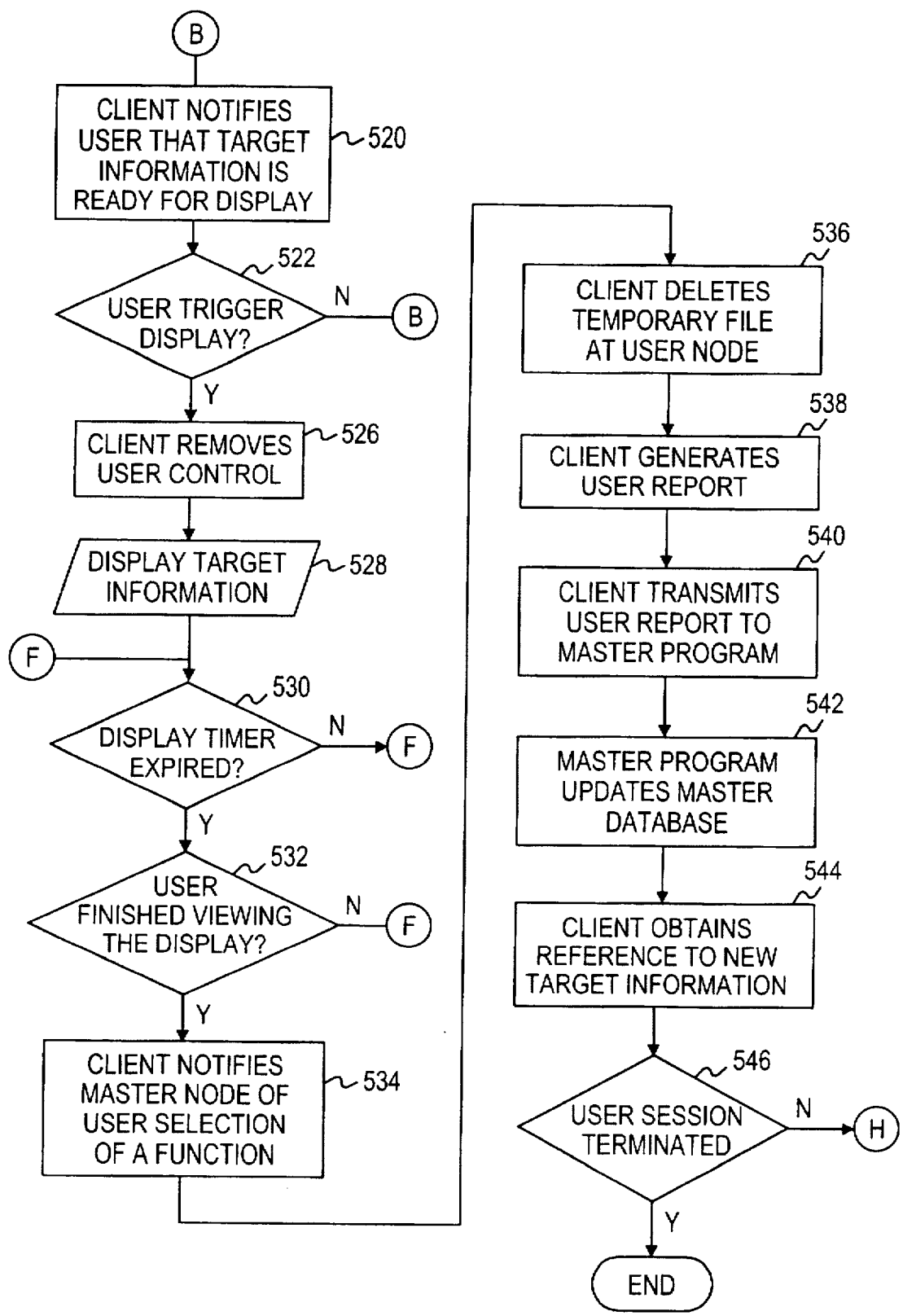

Referring to FIG. 5B, once the transfer of target information is complete, Client 122 notifies the user that the target information is ready for display by presenting a floating icon on the user's screen (step 520). Display of target information may be initiated by the user clicking the floating icon (step 522). Before displaying the target information, however, Client 122 preferably removes the user's window control and disables normal keyboard and mouse input at user node 120, thus ensuring that the user views the displayed information without interruption (step 526).

Once Client 122 detects that the floating icon has been selected, Client 122 opens a new browser window, for example, SPYGLASS API (Application Program Interface) compatible browser or a standard browser. The window is maximized to fill the whole display screen, and the user is presented with a display of the target information for a predetermined display time period (step 528). As mentioned above, during this predetermined period, the user preferably has no control of input devices such as keyboard or mouse.

Client 122 sets the display timer to determine the display period of the target information. When the display timer expires (step 530), however, a user may click the mouse button to acknowledge that the user has finished viewing the message (step 532). The click of the mouse releases the lock and enables user control of input devices. Additionally, Client 122 displays a menu of functions in the target information display.

These functions, such as DONE, MORE, SAVE, GET, and EXIT, may be represented by icons. The DONE icon notifies Client 122 that the user has finished viewing the displayed information. The MORE icon enables the user to access more information about the displayed item. Activation of this icon will connect the user to a predetermined web page of the particular information provider of the displayed target information. The SAVE icon saves the displayed target information on user node 120 for later retrieval or viewing. The GET icon allows the user to retrieve a previously saved target information, and EXIT icon closes the target information display and returns to the previous display.

When a user selects one of the functions, Client 122 notifies master node 130 (step 534) and deletes the target information from the temporary file at user node 120 (step 536). Client 122 also compiles and generates a user report containing display statistics, such as target information displayed, time and date of display, duration of display, optional request using the MORE icon, and accounting information (step 538). Client 122 eventually transmits the user report to master program 140 (step 540), and master program 140 updates master database 143 with the user report (step 542). Client 122 obtains another reference to new target information in accordance with the updated information (step 544).

The process discussed above of transferring and displaying target information continues until the conclusion of the user's session on computer network 100 (step 546). In the meantime, information providers 160 may access master program 140 for accurate and up-to-date user responses detailing display statistics.

During the user's session on network 100, client control program 144 periodically sends a message to Client 122 in the background to command Client 122 to continue operating. If Client 122 does not receive the message within a predetermined time period, e.g., user has disconnected from network 100 or abnormal termination occurred due to power failure, Client 122 cleans out the temporary file area of user node 120 and terminates its operation. Thus, Client 122 does not unnecessarily occupy temporary file area of user node 120 when the user is not connected to network 100.

CONCLUSION

This invention uses otherwise idle bandwidth by transmitting information specific to a user's profile while minimizing additional delay to the normal network traffic, and generates a report of user responses for information providers with accurate assessment of user demand. It does so by providing a new media channel, to assemble, distribute, and present information while it collects user responses.

The present invention is useful to non-commercial entities that desire to disseminate information to a target audience, for example, during an election campaign. Moreover, commercial advertisers can now obtain accurate user responses in order to strategically market their products and services. This invention also provides a forum for commercial information providers to subsidize user's online service costs in exchange for a user periodically viewing the target information during the user's session on the network.

It will be apparent to those skilled in the art that various modifications and variations can be made in the computer network of the present invention and in construction of this computer network without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention indicated by the following claims.

What is claimed is:

1. A computer network for connecting information providers and users, comprising:
   a user node including
      means for sending a node ID corresponding to the user node,
      means for receiving a target information reference,
      means for fetching target information using the target information reference, and
      means for controlling the transfer of the target information in a background state while receiving non-target information to the user node without additional communication delay;
   a master database containing profile information and corresponding target information reference;
   a master node, coupled to the user node, and including
      means for transferring the target information to the user node; and
   a master program, coupled to the master node and the master database, and including
      means for receiving the node ID from the user node,
      means for accessing from the master database profile information corresponding to the node ID, and
      means for transmitting the target information reference corresponding to the accessed profile information to the user node.

2. The computer network of claim 1, wherein the controlling means includes
   means for measuring round-trip delay time for delivering the target information.

3. The computer network of claim 2, wherein the controlling means further includes
   means for computing a ratio between the round-trip delay time and a predetermined minimum round-trip delay time for delivering the target information, and
   means for adjusting a transmission rate of the target information based on the computed ratio.

4. The computer network of claim 1, wherein the controlling means further includes means for requesting the target information corresponding to the target information reference.

5. The computer network of claim 1, wherein the controlling means includes means for fetching the target information during times when non-target information is not being sent.

6. The computer network of claim 1, further including means for notifying the user when the target information is ready for display once the transfer of the target information is complete.

7. A network traffic controller for controlling the transfer of target information without causing additional communication delay to non-target information traffic between a user node and a master node, comprising:

means for measuring round-trip delay time for delivering the target information;

means for computing a ratio between the round-trip delay time and a predetermined minimum round-trip delay time; and means for adjusting a transmission rate of the target information based on the computed ratio.

8. The network traffic controller of claim 7, wherein the adjusting means includes means for transferring no packets of target information, and means for adjusting the transmission rate after transferring each packet of the target information.

9. The network traffic controller of claim 7, further including means for receiving a target information reference, and means for requesting the target information corresponding to the target information reference.

10. The network traffic controller of claim 7, further including means for fetching the target information during times when non-target information is not being sent.

11. A master program, coupled to a master node and a master database, for connecting an information provider and a user node of a computer network, comprising:

means for registering the user node at the master node;

means for receiving, through the master node, a node ID from the user node;

means for accessing a master database for profile information corresponding to the node ID; and means for transmitting to the user node, through the master node, a target information reference corresponding to the accessed profile information, wherein the target information reference is a pointer to target information to be delivered to the user node while transferring non-target information without additional communication delay.

12. A user node for connecting information providers and users of a computer network having a master node, a master database, and a master program, the user node comprising:

means for sending to the master node a node ID corresponding to the user node;

means for receiving a target information reference from the master program;

means for controlling the transfer of target information in the background while transferring non-target information without additional communication delay between the master node and the user node; and means for receiving from the master node the target information corresponding to the target information reference.

13. The user node of claim 12, wherein the controlling means includes means for measuring round-trip delay time for delivering the target information.

14. The user node of claim 13, wherein the controlling means further includes means for computing a ratio between the round-trip delay time and a predetermined minimum round-trip delay time for delivering the target information, and means for adjusting a transmission rate of the target information based on the computed ratio.

15. The user node of claim 12, further including means for notifying the user when the target information is ready for display once the transfer of the target information is complete.

16. A method of connecting information providers and users, comprising the steps of:

sending from a user node to a master program a node ID corresponding to the user node;

accessing, by the master program, profile information corresponding to the node ID;

transmitting, by the master program, a target information reference corresponding to the accessed profile information to the user node;

fetching, by the user node, target information using the target information reference;

controlling, by the user node, the transfer of the target information in a background state while receiving non-target information to the user node without additional communication delay; and receiving, by the user node, the target information.

17. The method of claim 16, wherein the controlling step includes the step of measuring round-trip delay time for delivering the target information.

18. The method of claim 17, wherein the controlling step further includes the steps of computing a ratio between the round-trip delay time and a predetermined minimum round-trip delay time for delivering the target information, and adjusting a transmission rate of the target information based on the computed ratio.

19. The method of claim 16, wherein the controlling step includes the step of requesting the target information corresponding to the target information reference.

20. The method of claim 16, wherein the controlling step includes the step of fetching the target information during times when non-target information is not being sent.

21. The method of claim 16, further including the step of notifying the user when the target information is ready for display once the transfer of the target information is complete.

22. A method of controlling the transfer of target information without causing additional communication delay to non-target information traffic between a user node and a master node, comprising the steps of:

measuring round-trip delay time for delivering the target information;

computing a ratio between the round-trip delay time and a predetermined minimum round-trip delay time; and adjusting a transmission rate of the target information based on the computed ratio.

23. The method of claim 22, wherein the adjusting step includes the substeps of transferring packets of target information, and adjusting the transmission rate after transferring each packet of the target information.

24. The method of claim 22, further including the steps of receiving, by the user node, a target information reference, and requesting the target information corresponding to the target information reference.

25. The method of claim 22, further including the step of fetching the target information during times when non-target information is not being sent.

26. A method of connecting an information provider and a user node of a computer network, the method, performed by a master program, comprising the steps of:

registering the user node at a master node;

receiving, through the master node, a node ID from the user node;

accessing a master database for profile information corresponding to the node ID; and transmitting to the user node, through the master node, a target information reference corresponding to the accessed profile information, wherein the target information reference is a pointer to target information to be delivered to the user node while transferring non-target information without additional communication delay.

27. A method of connecting information providers and users of a computer network having a master node, a master database, and a master program, the method, performed by a user node, comprising the steps of:

sending to the master node a node ID corresponding to the master node;

receiving a target information reference from the master program;

controlling the transfer of target information in the background while transferring non-target information without additional communication delay between the master node and the user node; and receiving the target information corresponding to the target information reference.

28. The method of claim 27, wherein the controlling step includes the step of measuring round-trip delay time for delivering the target information.

29. The method of claim 28, wherein the controlling step further includes the steps of computing a ratio between the round-trip delay time and a predetermined minimum round-trip delay time for delivering the target information, and adjusting a transmission rate of the target information based on the computed ratio.

30. The method of claim 27, further including the step of notifying the user when the target information is ready for display once the transfer of the target information is complete.

* * * * *